United States Patent [19]

St. Aubin

[11] 4,309,468

[45] Jan. 5, 1982

[54] COMPOSITE LABEL WEB

[75] Inventor: George R. St. Aubin, Kettering, Ohio

[73] Assignee: Monarch Marking Systems, Inc., Dayton, Ohio

[21] Appl. No.: 223,442

[22] Filed: Jan. 8, 1981

[51] Int. Cl.³ .......................... B32B 3/10; B32B 3/16; G09F 3/00; B65D 65/30

[52] U.S. Cl. .......................................... 428/42; 428/43; 428/137; 428/916

[58] Field of Search ....................... 428/41, 43, 42, 40, 428/48, 137, 916

[56] References Cited

U.S. PATENT DOCUMENTS

| | | | |
|---|---|---|---|
| 3,221,427 | 12/1965 | Kaplan | 428/43 |
| 3,783,083 | 1/1974 | Jenkins | 428/43 |
| 4,116,747 | 9/1978 | Hamisch, Jr. | 156/384 |
| 4,188,250 | 2/1980 | Grass | 428/42 |
| 4,188,427 | 2/1980 | Grass | 428/41 |
| 4,207,365 | 6/1980 | Hamisch, Jr. | 428/41 |
| 4,210,688 | 7/1980 | Sato | 428/41 |

*Primary Examiner*—William J. Van Balen

*Attorney, Agent, or Firm*—Joseph J. Grass

[57] ABSTRACT

There is disclosed a composite web of two-part, tamper-indicating labels adapted to be used in a hand-held labeler. The labels are releasably adhered to a carrier web from which the labels can be dispensed at a delaminator of a labeler. The label has a coating of pressure sensitive adhesive which releasably adheres the label to the carrier web. A line of weakening defines a separate section. The separable section is configured to allow the label to be dispensed and applied to a product with the separable section and the reaminder of the label in tact, but enabling separation of the separable section when the remainder of the associated part of the label is attempted to be removed from the product.

15 Claims, 4 Drawing Figures

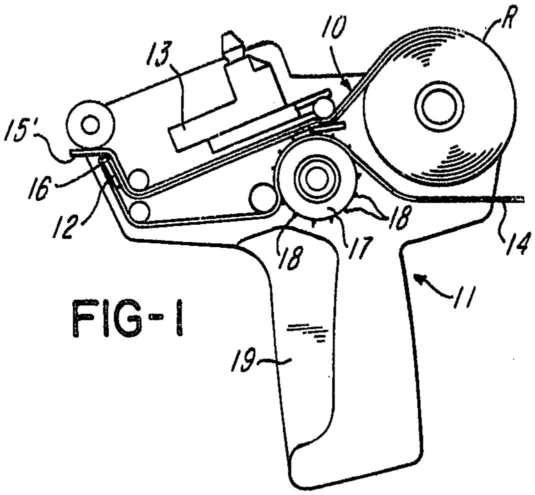
FIG-1
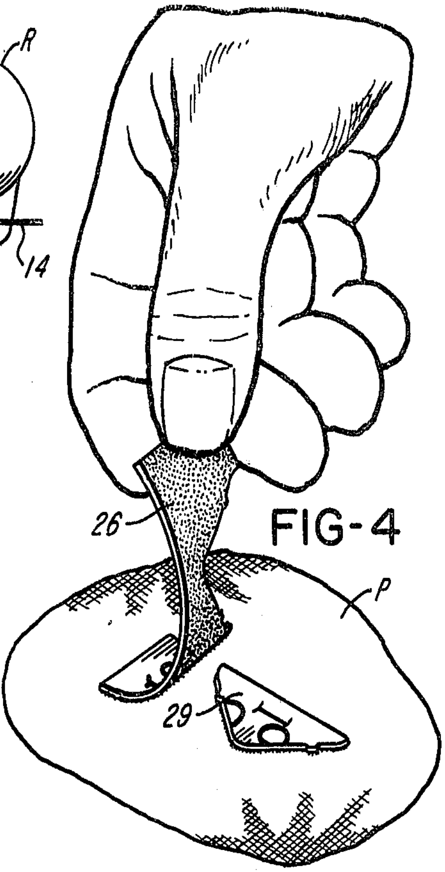
FIG-4
FIG-3
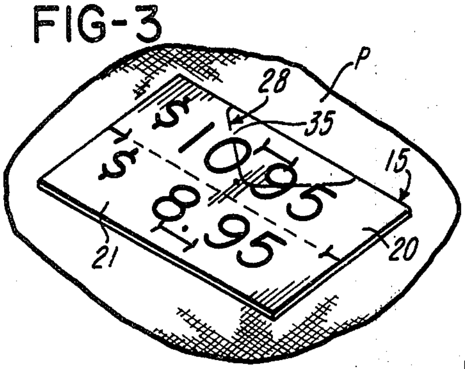
FIG-2
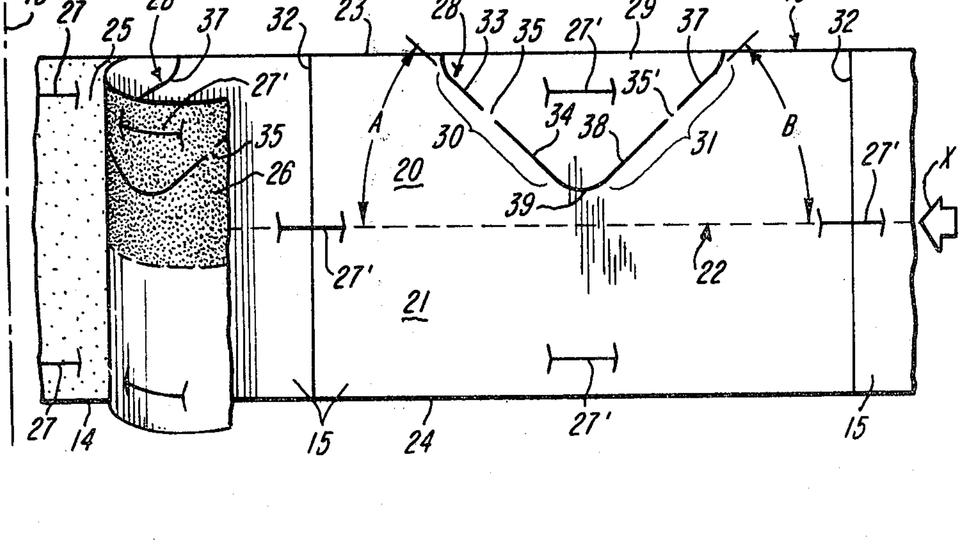

COMPOSITE LABEL WEB

BACKGROUND OF THE INVENTION

1. Field of the Invention

This invention relates to the art of composite webs of pressure sensitive labels.

2. Brief Description of the Prior Art

A prior art composite label web with two-part sale labels is disclosed in U.S. Pat. No. 4,188,427 granted Feb. 12, 1980 to Joseph J. Grass. Prior art patents using tamper-indicating cuts in a label web are U.S. Pat. No. 3,221,427 granted Dec. 7, 1965 to Irving Kaplan, and U.S. Pat. No. 3,783,083 granted June 1, 1974 to William A. Jenkins. It is known in the United States in the art of two-part labels of the "sale label" type to provide tamper-indicating cuts in the (permanent) label part which is intended to remain attached to the product, for example X-shaped cuts disposed wholly within the boundary of the permanent label part, or spaced longitudinal cuts in the permanent label part which cause the permanent label part to shred upon attempted removal.

SUMMARY OF THE INVENTION

According to the invention there is provided a label which is capable of being dispensed from a hand-held labeler and applied to a product and yet has a section which will separate when an attempt is made to remove the label from the product. The separable section is provided by a line of weakening in the label. The line of weakening is preferably spaced from both the leading and trailing edges of the label, but extends to one free side edge of the label. The line of weakening should be spaced from the leading edge of the label to prevent the leading marginal edge of the label from following around the delaminator or drooping upon application of the label to a product. This can cause the label to be improperly applied. The line of weakening should preferably be spaced from the trailing edge of the label to prevent the separable section from being pulled apart from the remainder of the label during application of the label. The line of weakening includes cuts completely through the label which meet the free side edge of the label. This facilitates separation of the separable section upon attempted removal from a product. The pressure sensitive adhesive also holds the separable section to the remainder of the associated label part because the adhesive bridges the separable section and the adjacent label part. The cuts that form the line of weakening are preferably completely through the label, except for frangible lands spaced from the free side edges of the label. The line of weakening is essentially comprised in the preferred embodiment of a leading portion and a trailing portion, both of which are inclined with respect to the lengthwise or longitudinal direction along the carrier web. The leading portion preferably has one frangible land and the trailing portion also has one frangible land. The lands and the adhesive are adequate to hold the separable section in the plane of the label, that is, prevent separation of the separable section until the label has been applied to the product. And yet, attempted removal causes the separable section to separate upon fracture of the frangible lands.

BRIEF DESCRIPTION OF THE DRAWINGS

FIG. 1 is a side elevational, diagrammatic view of a labeler for using a composite label web in accordance with the invention;

FIG. 2 is an enlarged top plan view of the composite label web with a portion of one label peeled back to expose the carrier web and the underside of the label;

FIG. 3 is a perspective view of the label applied to a product; and

FIG. 4 is a perspective view showing one of the label parts (the sale part) as having been removed and showing an attempt to remove the other part and separation from its separable section.

DETAILED DESCRIPTION OF THE PREFERRED EMBODIMENT

The composite label web 10 of the invention can be used in a commercially available type of hand-held labeler sold by Monarch Marking Systems, Inc., Dayton, Ohio U.S.A. as illustrated in their U.S. Pat. No. 4,116,747 granted on Sept. 26, 1978 to Paul H. Hamisch, Jr. Such a labeler 11 is diagrammatically illustrated in FIG. 1 of the present application. The composite web 10 which is wound into a roll R is guided to a platen 12 disposed opposite a print head 13. The composite web 10 includes a carrier web 14 to which labels 15 are releasably adhered. The carrier web 14 is caused to undergo a sharp change of direction at a delaminator 16 at which the leading label 15' is thereby caused to delaminate from the web 14 as the web 14 is advanced by a toothed driver 17. Movement of the driver 17 stops before the leading label 15' is entirely delaminated so that the trailing marginal edge of the leading label 15' is still adhered to the carrier web 14 and the leading label 15' is beneath an applicator 12', as shown in FIG. 1. The driver 17 takes the form of a wheel having peripherally spaced teeth 18. The print head 13 and the driver 17 are sequentially operated in response to movement of an actuator 19.

The composite web 10 is shown in greater detail in FIG. 2 in which part of one label is peeled back. The labels 15 are shown to be two-part labels which are separated into first and second label parts 20 and 21 by a longitudinally extending line of weakening 22. The cuts 22 can be formed by any suitable method, as by perforating, creasing, or scoring. Although the line of weakening 22 is shown to be spaced midway between free side edges 23 and 24, other spacings can be used. The carrier web 14 is shown to have a release coating on its upper surface indicated by light stippling 25. The underside of only the first label part 20 of each label 15 is shown to have a uniform coating of pressure sensitive adhesive indicated by heavy stippling 26. As shown the adhesive 26 extends between the free side edge 23 and the line of weakening 22. The carrier web 14 has a series of cuts 27 with which teeth 18 of the driver 17 are adapted to engage. The cuts 27 extend through the carrier web 14 and preferably extend through the labels 15 as well as indicated at 27'. The travel of the web 10 in FIG. 2 is in the direction of arrow X toward the delaminator 16.

Each label 15 is provided with a line of weakening 28 which defines a separable section 29 in the first label part 20. The line of weakening 28 is comprised essentially of a leading portion 30 and a trailing portion 31. The labels 15 are formed by butt cuts 32 which define the respective leading and trailing edges of adjacent labels 15. The leading portion 30 of the label 15 is closer to the leading edge of that label, and the trailing portion 31 is closer to the trailing portion of the label 15. The leading portion is shown to be comprised of two cuts 33 and 34 through the label 15 spaced by a frangible land 35. The land 35 can either be uncut or it can be made to extend only partly through the label 15. The cuts 33 and 34 of the leading portion 30 are inclined in one direction at an acute angle A with respect to the longitudinal direction of web travel. The trailing portion 31 is shown to be comprised of two cuts 36 and 37 through the label 15 spaced by a frangible land 35'. A land, such as the land 35, should be provided in the leading portion 30 even if the land 35' is omitted. The cuts 34 and 38 are joined as indicated at 39. The cuts 36 and 37 of the trailing portion 31 are inclined in the reverse direction at an acute angle B with respect to the longitudinal direction of web travel. The angles A and B are shown to be equal. The leading and trailing portions 30 and 31 are thus equal in length and form sides of an equilateral triangle having a base at free side edge 23. Because of the inclination of both leading and trailing portions 30 and 31, the line of weakening 28 passes progressively, essentially one point-at-a-time, about the delaminator 16. Even though the cut 33 extends all the way to the free side edge 23, it does not follow about the delaminator 16 because of its progressive encounter with the delaminator 16. The adhesive 26 offers some assistance in holding the separable section 29 in the plane of the remainder of the first label part 20 because the adhesive 26 bridges the separable section and the remainder of the first label part 20. Also, the lands 35 and 38 tend to maintain the separable section in the plane of the remainder of the first label part 20.

FIG. 3 shows the label 15 as applied to a product P and FIG. 4 shows the attempted removal of the label 15 from the product P. The adhesive 26 is preferably of the permanent type and thus removal of the remainder of the first label part 20 without destruction thereof is most difficult. It is even more difficult to avoid destroying the first label part 20 because of the ease with which the separable portion 29 is separated as shown in FIG. 4. The lands 35 and 38 fracture readily and the permanent type adhesive under the portion 29 adheres the portion 29 securely to the product P. Thus, any attempt to re-use the label part 20 would be readily apparent, and thus the label 15 is considered to be of the tamper-indicating type.

By way of example, not limitation, each of the angles A and B is between about 42 degrees and about 52 degrees. In the illustrated embodiment the angles A and B are each about 47 degrees.

Other embodiments and modifications of this invention will suggest themselves to those skilled in the art, and all such of these as come within the spirit of the invention are included within its scope as best defined by the appended claims.

I claim:

1. A composite web of tamper-indicating labels adapted to be used in a hand-held labeler, comprising: a carrier web, a series of labels releasably adhered to the carrier web at longitudinal intervals along the carrier web, the labels being adapted to be dispensed from the carrier web at a delaminator of a hand-held labeler, pressure sensitive adhesive releasably adhering the labels to the carrier web, means in each label defining a separable section which does not interfere with delamination of the label from the carrier web at the delaminator or application of the delaminated label to a product but which separates from the remainder of the label upon attempted removal from the product to which the label has been applied, the line of weakening which defines the separable section being spaced from the leading edge of each label to prevent a leading marginal edge of the leading label from deflecting about the delaminator, the pressure sensitive adhesive bridging the line of weakening which defines the separable section to hold the separable section to the remainder of the label until the label has been applied to the product, and the line of weakening which defines the separable section in each label having a leading portion starting with a cut through the label at the free side edge of the label and extending away from the free side edge and away from the leading edge of the label.

2. A composite web of tamper-indicating labels adapted to be used in a hand-held labeler, comprising: a carrier web, a series of labels releasably adhered to the carrier web at longitudinal intervals along the carrier web, the labels being adapted to be dispensed from the carrier web at a delaminator of a hand-held labeler, pressure sensitive adhesive releasably adhering the label to the carrier web, means in each label defining a separable section which does not interfere with delamination of the label from the carrier web at the delaminator or application of the delaminated label to a product but which separates from the remainder of the label upon attempted removal from the product to which the label has been applied, the line of weakening which defines the separable section being spaced from the leading edge of each label to prevent a leading marginal edge of the leading label from deflecting about the delaminator, the pressure sensitive adhesive bridging the line of weakening which defines the separable section to hold the separable section to the remainder of the label until the label has been applied to the product, the line of weakening which defines the separable section in each label being laterally inclined essentially entirely throughout its length, and includes a leading portion laterally inclined in one direction and a trailing portion laterally inclined in the reverse direction, and both the leading portion and the related trailing portion meeting the free side edge of the label at a through-cut.

3. A composite label web as defined in either claim 1 or claim 2, wherein each separable section is generally triangular.

4. A composite label web as defined in either claim 1 or claim 2, wherein the line of weakening which defines the separable section of each label is spaced from the trailing edge of the label.

5. A composite label web as defined in either claim 1 or claim 2, wherein the line of weakening completely severs the separable section of the label except at at least one frangible land.

6. A composite label web as defined in either claim 1 or claim 2, wherein the line of weakening which defines the separable section also includes a trailing portion and extends completely through the label except at a frangible land in the leading portion and at a frangible land in the trailing portion.

7. A composite label web as defined in either claim 1 or claim 2, wherein each said leading portion is essentially straight.

8. A composite web as defined in claim 7, wherein the line of weakening which defines the separable section includes a trailing portion joined to the leading portion, wherein the trailing portion is essentially straight.

9. A composite web as defined in either claim 1 or claim 2, wherein each said leading portion is essentially straight and is laterally inclined at between about 47 degrees with respect to the longitudinal direction.

10. A composite web as defined in either claim 1 or claim 2, wherein each said leading portion is essentially straight and is laterally inclined at between about 42 and 52 degrees with respect to the longitudinal direction, and wherein each said trailing portion is essentially straight and is laterally inclined at between about 42 and 52 degrees with respect to the longitudinal direction.

11. A composite label web as defined in either claim 1 or claim 2, wherein each separable section is in the shape of an equilateral triangle, with the base of the triangle being along the free side edge of the label.

12. A composite web of tamper-indicating labels adapted to be used in a hand-held labeler, comprising: a carrier web, a series of labels releasably adhered to the carrier web at longitudinal intervals along the carrier web, the labels being adapted to be dispensed from the carrier web at a delaminator of a hand-held labeler, pressure sensitive adhesive releasably adhering the labels to the carrier web, means in each label defining a separable section which does not interfere with delamination of the label from the carrier web at the delaminator or application of the delaminated label to a product but which separates from the remainder of the label upon attempted removal from the product to which the label has been applied, the line of weakening which defines the separable section being spaced from the leading edge of each label to prevent a leading marginal edge of the leading label from deflecting about the delaminator, the pressure sensitive adhesive bridging the line of weakening which defines the separable section to hold the separable section to the remainder of the label until the label has been applied to the product, the line of weakening which defines the separable section in each label having a leading portion starting with a cut through the label at the free side edge of the label and extending away from the free side edge and away from the leading edge of the label, a longitudinally extending line of weakening between the free side edges of the labels partially severing each label into first and second label parts, and each first label part having the pressure sensitive adhesive and containing the separable section.

13. A composite web of tamper-indicating labels adapted to be used in a hand-held labeler, comprising: a carrier web, a series of labels releasably adhered to the carrier web at longitudinal intervals along the carrier web, the labels being adapted to be dispensed from the carrier web at a delaminator of a hand-held labeler, pressure sensitive adhesive releasably adhering the label to the carrier web, means in each label defining a separable section which does not interfere with delamination of the label from the carrier web at the delaminator or application of the delaminated label to a product but which separates from the remainder of the label upon attempted removal from the product to which the label has been applied, the line of weakening which defines the separable section being spaced from the leading edge of each label to prevent a leading marginal edge of the leading label from deflecting about the delaminator, the pressure sensitive adhesive bridging the line of weakening which defines the separable section to hold the separable section to the remainder of the label until the label has been applied to the product, the line of weakening which defines the separable section in each label being laterally inclined essentially entirely throughout its length and includes a leading portion laterally inclined in one direction and a trailing portion laterally inclined in the reverse direction, both the leading portion and the related trailing portion meeting the free side edge of the label at a through-cut, a longitudinally extending line of weakening between the free side edges of the labels partially severing each label into first and second label parts, and each first label part having the pressure sensitive adhesive and containing the separable section.

14. A composite web of tamper-indicating labels adapted to be used in a hand-held labeler, comprising: a carrier web, a series of labels releasably adhered to the carrier web at longitudinal intervals along the carrier web, the labels being adapted to be dispensed from the carrier web at a delaminator of a hand-held labeler, pressure sensitive adhesive releasably adhering the labels to the carrier web, means in each label defining a separable section which does not interfere with delamination of the label from the carrier web at the delaminator or application of the delaminated label to a product but which separates from the remainder of the label upon attempted removal from the product to which the label has been applied, the line of weakening which defines the separable section being spaced from the leading edge of each label to prevent a leading marginal edge of the leading label from deflecting about the delaminator, the pressure sensitive adhesive bridging the line of weakening which defines the separable section to hold the separable section to the remainder of the label until the label has been applied to the product, the line of weakening which defines the separable section in each label having a leading portion starting with a cut through the label at the free side edge of the label and extending away from the free side edge and away from the leading edge of the label, a longitudinally extending line of weakening between the free side edges of the labels partially severing each label into first and second label parts, each first label part having the pressure sensitive adhesive and containing the separable section, and wherein the line of weakening which defines the separable section is spaced from the line of weakening that divides each label into the first and second label parts.

15. A composite web of tamper-indicating labels adapted to be used in a hand-held labeler, comprising: a carrier web, a series of labels releasably adhered to the carrier web at longitudinal intervals along the carrier web, the labels being adapted to be dispensed from the carrier web at a delaminator of a hand-held labeler, pressure sensitive adhesive releasably adhering the label to the carrier web, means in each label defining a separable section which does not interfere with delamination of the label from the carrier web at the delaminator or application of the delaminated label to a product but which separates from the remainder of the label upon attempted removal from the product to which the label has been applied, the line of weakening which defines the separable section being spaced from the leading edge of each label to prevent a leading marginal edge of the leading label from deflecting about the delaminator, the pressure sensitive adhesive bridging the line of weakening which defines the separable section to hold the separable section to the remainder of the label until the label has been applied to the product, the line of weakening which defines the separable section in each label being laterally inclined essentially entirely throughout its length and includes a leading portion laterally inclined in one direction and a trailing portion laterally inclined in the reverse direction, both the leading portion and the related trailing portion meeting the free side edge of the label at a through-cut, a longitudinally extending line of weakening between the free side edges of the labels partially severing each label into first and second label parts, each first label part having the pressure sensitive adhesive and containing the separable section, and wherein the line of weakening which defines the separable section is spaced from the line of weakening that divides each label into the first and second label parts.

* * * * *